(12) United States Patent
Foscan et al.

(10) Patent No.: US 7,163,364 B2
(45) Date of Patent: Jan. 16, 2007

(54) CLAMP FOR A KEY CUTTING MACHINE

(75) Inventors: Eros Foscan, Mareno di Piave (IT); Ladd-E Urbas, Mentor, OH (US)

(73) Assignee: Bianchi 1770 S.p.A., Conegliano (IT)

( * ) Notice: Subject to any disclaimer, the term of this patent is extended or adjusted under 35 U.S.C. 154(b) by 83 days.

(21) Appl. No.: 11/024,219

(22) Filed: Dec. 28, 2004

(65) Prior Publication Data

US 2006/0062644 A1   Mar. 23, 2006

(30) Foreign Application Priority Data

Sep. 22, 2004   (IT)   ............................ PN2004A0066

(51) Int. Cl.
*B23C 3/35* (2006.01)
(52) U.S. Cl. ........................ 409/81; 409/225; 269/303; 269/315; 76/110
(58) Field of Classification Search .................. 409/81, 409/82, 83, 225; 76/110; 269/303, 315
See application file for complete search history.

(56) References Cited

U.S. PATENT DOCUMENTS

| | | | |
|---|---|---|---|
| 3,865,011 A | | 2/1975 | Patriquin et al. |
| 4,188,163 A | * | 2/1980 | Juskevic ........................ 409/82 |
| 4,426,179 A | * | 1/1984 | Jefferson ...................... 409/82 |
| 4,687,389 A | | 8/1987 | Santii et al. |
| 5,127,532 A | * | 7/1992 | Cimino et al. ................. 76/110 |
| 5,607,267 A | * | 3/1997 | Heredia et al. ................ 76/110 |
| 6,641,339 B1 | | 11/2003 | Chies et al. |
| 2002/0182022 A1 | | 12/2002 | Chies et al. |

FOREIGN PATENT DOCUMENTS

| | | |
|---|---|---|
| DE | 31 47 248 C1 | 3/1983 |
| EP | 0 562 490 A1 | 9/1993 |
| EP | 0 746 439 B1 | 8/1997 |
| FR | 2173004 | 10/1973 |
| FR | 2199493 | 4/1974 |
| FR | 2306043 | 10/1976 |
| WO | WO 95/23666 | 9/1995 |

OTHER PUBLICATIONS

International Search Report mailed Feb. 13, 2006.

* cited by examiner

*Primary Examiner*—Dana Ross
(74) *Attorney, Agent, or Firm*—Fay, Sharpe, Fagan, Minnich & McKee, LLP

(57) ABSTRACT

A clamp for a key cutting machine includes a base portion having opposing shoulders defining an accommodation. A pair of jaws is housed in the accommodation of the base portion for holding a key blank for cutting thereof. At least one of the jaws is movable relative to the other one of the jaws. An adjustable locator device is disposed on at least one of the base portion and the pair of jaws for bringing the key blank into a cutting position. Opposed plates close open ends of the accommodation. One of the plates includes a key insertion aperture for insertion of the key blank between the pair of jaws to identify the key blank as a correct match and prevent the key blank from tipping over.

25 Claims, 2 Drawing Sheets

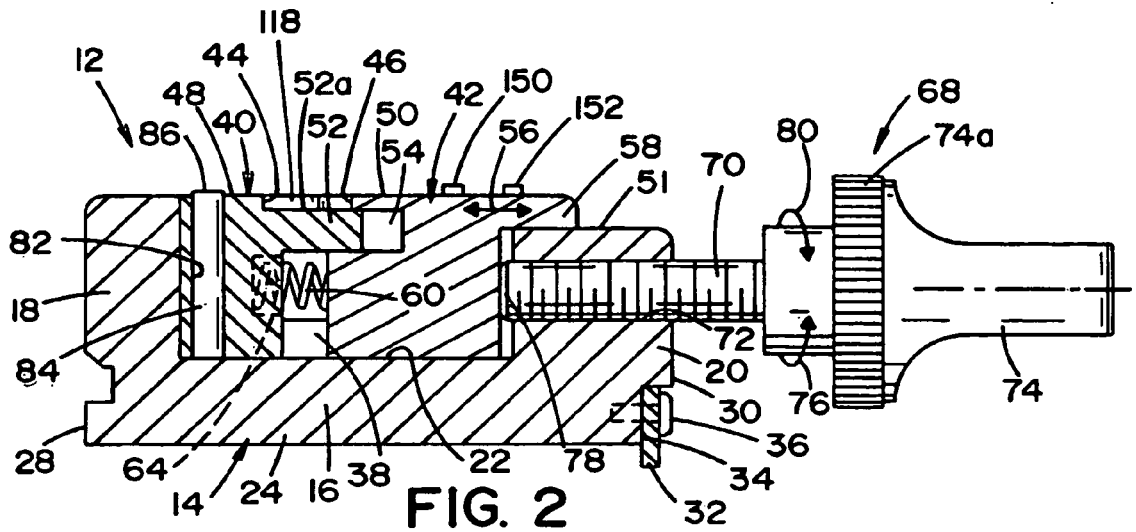

CLAMP FOR A KEY CUTTING MACHINE

CROSS-REFERENCE(S) TO RELATED APPLICATION(S)

This application is related to the U.S. Patent Application entitled "KEY CUTTING MACHINE" Ser. No. 11/024,144, filed concurrently herewith and expressly incorporated herein by reference. The current application claims priority from Foreign Patent Application No. PN2004A000066 filed Sep. 22, 2004.

BACKGROUND

The present invention relates to an improved kind of clamp for holding a key blank during cutting thereof and adapted to be used in conjunction with a key cutting machine for cutting the key blank.

Prior-art key cutting machines are known to generally include clamp in which a key blank is inserted and clamped for subsequent cutting by a milling operation aimed at imparting a desired mechanical code, i.e. the bit notch pattern, to the key blank. Two such clamps or vices are typically provided in conventional key cutting machines, including a first clamp for the key blank and a second clamp for holding an original key already having the desired mechanical code cut therein. More recent key cutting machines, however, generally employ only a single clamp for holding the key blank, since all information needed to code it, i.e. to cut the desired bit notch pattern, is selected and retrieved from an electronic storage memory and transmitted to the operating parts of the cutting machine directly therefrom.

The correct positioning of each key or key blank in its respective clamp can be obtained, according to the various types of keys involved, through the use of fixed locator provisions provided in the clamp itself or, possibly, retaining members to be selectively inserted in appropriate reference receptacles provided in the clamp for this particular purpose. The need for selectively positionable retaining, i.e. locating, members to be used in such clamps is basically due to the fact that key blanks and keys have different lengths depending on the applications in which the keys are or will be used. As far as the key or key blank itself is concerned, the tip or the rear thereof can act as a locator means or, alternatively, a shoulder of the key blank or some other reference surface of the key blank can be used as a locator means.

The use of removable locating means on the clamp carries a number of practical drawbacks with it, the most dangerous of which is represented by the operator possibly omitting to remove the locating member from the clamp before starting cutting machine operation, which could result in the machine itself undergoing serious damages. In view of doing away with such drawback, U.S. Pat. No. 6,641,339 discloses a clamp including a pair of jaws that are movable relative to each other, so as to define an accommodation in which the key is to be inserted, and a locator provision that is associable to such accommodation to hold the key clamped in position. The locator is pivotally coupled on to the body of the clamp and is provided with a groove, along which there is capable of sliding the threaded stem of a screw that enables a retaining member to be selectively locked at any one of a plurality of slots provided on the sides of the jaws.

Despite attempting to do away with the drawback referenced above, the approach disclosed in the '339 patent still calls for the use of a removable member (gauge), which must be removed before the key cutting operation is started, in view of preventing it from interfering with the operating parts of the key cutting machine, when the latter is operated. In addition, a clamp of this kind is not able to solve a number of other problems. For example, it does not reliably ensure a correct clamping of the key in the clamp itself, so as to avoid the risk of the key possibly tilting or tipping over in its accommodation. Furthermore, the clamp is not suitable for application in a key cutting machine for the cutting of so-called "laser-type" keys, which require being processed, i.e. cut, on the two major surfaces of the key blade.

SUMMARY

In accordance with one aspect, a clamp is provided for a key cutting machine. More particularly, in accordance with this aspect, the clamp includes a base portion having opposing shoulders defining an accommodation. A pair of jaws is housed in the accommodation of the base portion for holding a key blank for cutting thereof. At least one of the jaws is movable relative to the other one of the jaws. An adjustable locator device is disposed on at least one of the base portion and the pair of jaws for bringing the key blank into a cutting position. Opposed plates close open ends of the accommodation. One of the plates includes a key insertion aperture for insertion of the key blank between the pair of jaws to identify the key blank as a correct match and prevent the key blank from tipping over.

In accordance with another aspect, a clamp is provided for a key cutting machine. The clamp includes a base portion supporting a pair of opposed jaws. At least one of the jaws is moveable relative to the other for holding a key blank for cutting by the key cutting machine. An end plate is adjacent the jaws and defines a key insertion aperture that matches a head of the key blank for confirming that the key blank is a correct match. The end plate and the key insertion aperture prevent the key blank from tipping when the key blank is installed between the jaws.

In accordance with yet another aspect, a clamp is provided for a key cutting machine. More particularly, in accordance with this aspect, the clamp includes first and second jaws for clamping a key blank therebetween. The first jaw is fixedly secured to a rib and the second jaw is moveable relative to said first jaw. A plate is provided adjacent at least one of the first and second jaws. The plate has a key insertion aperture therethrough that prevents the key blank from tipping during cutting thereof. The key insertion aperture directs a blade of the key blank between the first and second jaws. The rib is cooperatively received in a corresponding groove of a key cutting machine.

According to still yet another aspect, a clamp is provided for a key cutting machine, including means for identifying the type of key that is to be duplicated or cut, and reliably ensuring the correct insertion of the key in the cutting position thereof, while eliminating or reducing the risk for the same key to tilt or tip over during cutting.

According to still another aspect, a clamp is provided for a key cutting machine, including means for a key duplicating or cutting machine to be able to reliably identify the key to be cut or duplicated, and for the clamp itself to be accurately positioned in a calibrated manner relative to a machine or cutting plane of the cutting machine.

According to another aspect, a clamp for a key cutting machine is provided including the provision of ensuring that cutting chips generated from cutting a key blank held in the clamp are collected and/or discharged in an improved manner from a key cutting area.

According to yet another aspect, a clamp for a key cutting machine includes a key-tip stop or abutment element that acts as a locating reference for some key models or types, wherein the tip-abutment locator is permanently associated and/or attached to the clamp without it either constituting any kind of hindrance to a cutting tool of the key cutting machine during the cutting process or getting in the way when key blanks are inserted.

According to a further aspect, a clamp for a key cutting machine is provided, including setting and adjustment means thereon for positioning a milling cutter of the key cutting machine along an axis extending perpendicular relative to a cutting plane of a key blank held by the clamp.

BRIEF DESCRIPTION OF THE DRAWINGS

FIG. 2 is a cross-sectional view of the clamp shown in FIG. 1, as viewed along the line 2–2.

FIG. 3 is a cross-sectional view of the clamp shown in FIG. 1, as viewed along the line 3–3.

FIG. 4 is a cross-sectional view of the clamp shown with the key inserted therein.

DETAILED DESCRIPTION

Figure 1:
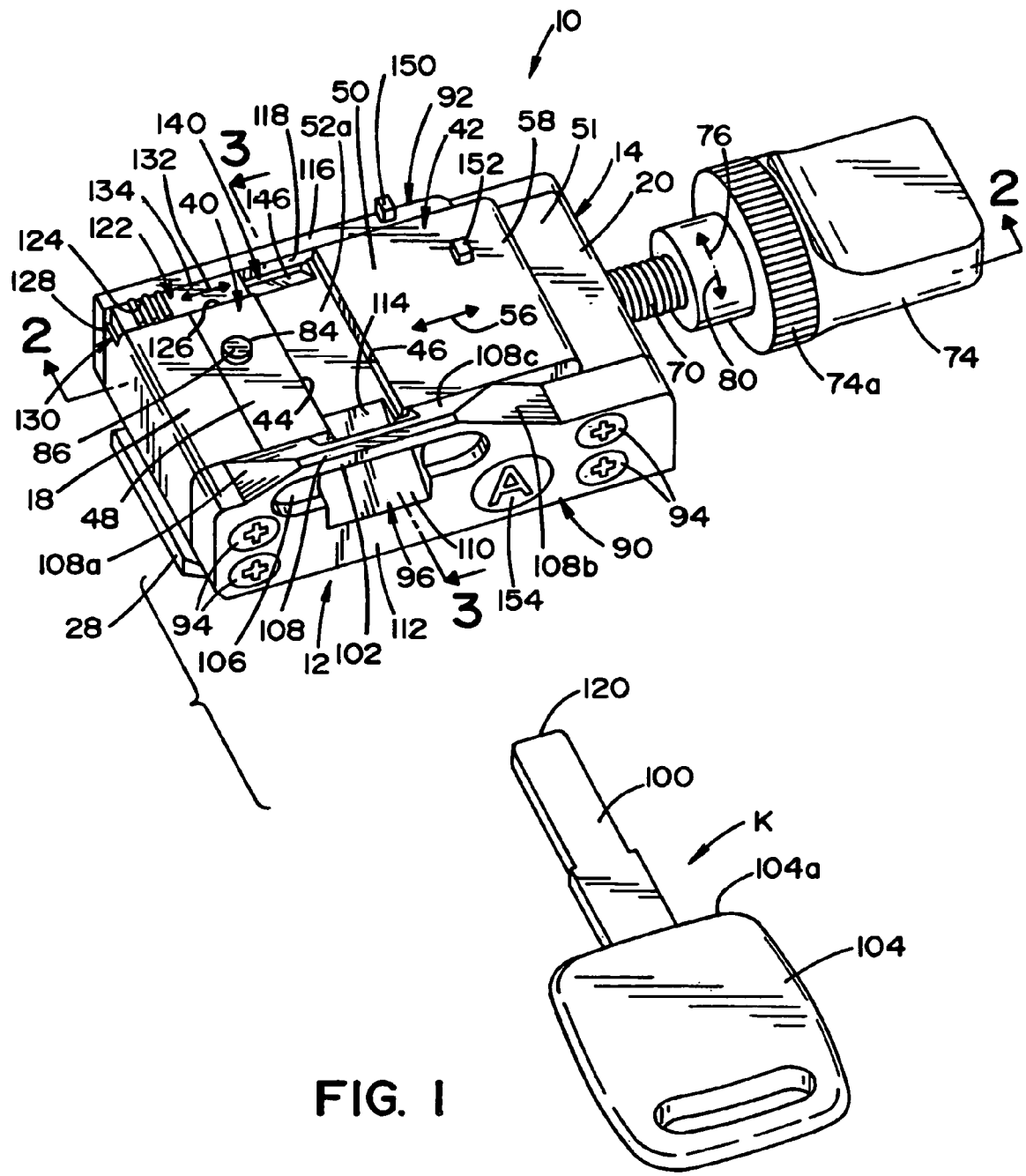
FIG. 1 is a perspective view of a key and clamp assembly including a clamp and a key to be inserted therein.

Referring now to the drawings wherein the showings are for purposes of illustrating one or more embodiments and are not to be construed as limiting the invention, a clamp assembly for a key cutting machine is shown and generally designated by reference numeral 10. With specific reference to FIG. 1, the clamp assembly includes a vice or clamp 12 that holds an associated key (or more particularly a key blank) K for a key cutting machine (not shown). More particularly, the clamp 12 is removably attachable to the key cutting machine and secures the key blank K during cutting thereof by the key cutting machine. As will be described in more detail below, the clamp assembly 10 includes means for identifying the key blank K as a correct match for the clamp 12 and means for preventing the key blank K from tipping over during cutting thereof.

More specifically, with additional reference to FIGS. 2 and 3, the clamp 12 of the illustrated embodiment includes a body portion 14 formed of a parallelepiped-shaped base 16, a pair of spaced apart shoulders 18,20 extending from a top side 22 of the base 16, and a protruding rib 24 extending from an underside 26 of the base 16. In the illustrated embodiment, the protruding rib 24 has a dovetail-shaped cross-section which is adapted to be inserted and slide in a complementarily shaped guiding runner (not shown) defined in a cutting base of the key cutting machine. The rib 24 extends along the base 16 from about a first end 28 to about a second end 30 of the body portion 14.

The clamp 12 further includes an attached abutment means or member 32 which acts as a limit stop when the clamp rib 24 is received in the cutting machine runner. In the illustrated embodiment, the limit stop member 32 is positioned adjacent the second end 30 of the body portion 14 and extends in a direction approximately normal relative to the protruding rib 24. Moreover, the limit stop member 32 is positioned within a notch or recess 34 defined in the body portion 14 adjacent the underside 26 thereof. A suitable fastener 36, such as a screw, rivet or other type of connector, can be used to secure the limit stop member 32 to the body portion 14.

As already mentioned, the spaced apart shoulders 18,20 extend from the top side 22 which is opposite the underside 26 from which the protruding rib 24 extends. The shoulders 18,20 can be said to be mutually opposing and/or facing one another. An accommodation or channel 38 is defined between the shoulders 18,20 for housing a pair of jaws 40,42 of the clamp 12. Thus, the clamp 12 includes jaws 40,42 which are received in the channel 38. The jaws 40,42 are able to clamp the key blank K therebetween for purposes of fixedly holding the key blank K during cutting by the cutting machine. The jaws 40,42 have respective clamping edges 44,46, defining respective planes, against which the key blank K is held during cutting thereof by the key cutting machine. Top surfaces 48,50 of the jaws 40,42 are generally co-planar with one another.

In the illustrated embodiment, the first jaw 40 is positioned adjacent or rests against the shoulder 18. The first jaw 40 is fixedly fastened or secured to the body portion 14 by one or more suitable fasteners, such as screws (not shown). The second jaw 42 is positioned adjacent the shoulder 20 and is moveably or slidably secured to the base 16 of the body portion 14. More particularly, the first jaw 40 includes a protruding portion 52 that fits into and is received in a corresponding, complentarily-shaped recess 54 defined in the jaw 42. The second jaw 42 is able to slide or move back and forth as indicated by arrow 56. An overlapping portion 58 of the jaw 42 rests upon, in sliding engagement, with the top side 51 of the shoulder 20. The protruding portion 52, and more specifically a top side 52a of the protruding portion, additionally serves as a resting surface for the key blank K.

The configuration of the movable jaw 42 and the interpenetration of the first jaw protruding portion 52 into the second jaw recess 54 prevents the second jaw 42 from being pulled out from the body 14, without first removing the first jaw 40. Biasing members or means, such as helical springs 60,62, are disposed between the jaws 40,42 to urge the moveable jaw 42 apart from the fixed jaw 40, as shown in FIG. 2. The springs 60,62 are fitted or received in respective dead holes or bores 64, 66 defined in the fixed jaw 40 and extending partially thereinto. Alternately, corresponding, coaxial dead holes or bores can be provided in the movable jaw, like the bores 64,66, for also receiving the springs 60,62. When two bores are employed for each spring they would generally or preferably be provided in axially opposed positions in the jaws 40,42. Of course, as will be appreciated by those skilled in the art, one or more than two springs, or other urging members, could be employed in a variety of configurations for urging the moveable jaw 42 away from the fixed jaw 40.

The clamp 12 also includes an adjustable locator device 68 for bringing the key blank K into a cutting position (i.e., clamping the key blank K between the jaws 40,42 when the key is inserted into the clamp 12). In the illustrated embodiment, the adjustable locator device 68 includes a pin 70 provided in the shoulder 20 adjacent the moveable jaw 42 for selectively forcing the moveable jaw toward the fixed jaw 40 against the urging of the springs 60,62. In the illustrated embodiment, the pin 70 is threadedly received in a threaded throughhole 72 defined through the shoulder 20 in a direction parallel to the direction of movement of the moveable jaw 42 (and the rib 24). The pin 70 includes a rotary handle 74 for facilitating turning of the pin.

Turning the handle 74 in a first direction, such as clockwise in the direction of arrow 76, can be used to thread or screw the pin into the shoulder 20 which, due to engagement between a distal end 78 of the pin 70 and the moveable jaw 42, forcibly moves the moveable jaw toward the fixed jaw 40 against the urging of the springs 60,62. Turning the handle 74 in a second direction, such as counterclockwise in the direction of arrow 80, can be used to unthread or unscrew the pin from the shoulder, which allows the springs 60,62 to urge or forcibly separate the moveable jaw 42 from fixed jaw 40. The rotary handle 74 can include a friction surface 74a extending circumferentially therearound for facilitating turning of the handle 74.

The fixed jaw 40 includes a dowel bore or hole 82 into which a press-fitted dowel 84 is inserted or received. An end portion 86 of the dowel 84 slightly protrudes from the top surface 48 of the fixed jaw 40 and, in a preferred embodiment, is smoothly polished. As will be understood and appreciated by those skilled in the art, the polished end portion 86 can be used as a fixed calibration and/or setting reference contact of a machine or cutting tool (not shown) of the cutting machine along an axis extending orthogonal to a cutting plane of the key blank K. Thus, prior to cutting and/or for initially installing the cutting tool in the cutting machine, the tip of the cutting tool can be touched off against the end portion 86.

The recess 38, in which the jaws 40,42 are housed or received, that is defined by the body portion shoulders 18,20 is further delimited or closed by a pair of containment or end plates 90,92. The plates, including first plate 90 and second plate 92, are secured to the body portion 14 on opposite sides thereof by suitable fasteners, such as screws 94, thereby forming a single or unitary structural block. In the illustrated embodiment, four screws 94 are used to secure each of the plates 90,92 to the body portion 14, and specifically the shoulders 18,20 and base 16 of the body portion 14. The plates 90,92 close open ends of the channel 38.

The first plate 90 includes or defines a key insertion aperture 96 therethrough into which, with additional reference to FIG. 4, the key blank K is inserted in the direction of arrow 98 for positioning or guiding a blade 100 of the key blank K between the jaws 40,42. The plate 90 includes a bridge or bridge-like member 102 that defines or closes a top of the aperture 96. More particularly, the bridge 102 rises or is positioned above a plane defined by top surfaces 48,50 of the jaws 40,42. When the key blank K is inserted through the aperture 96, the plate 90 and its aperture can be used to identify the key blank as a correct match for the clamp 12.

More particularly, the aperture 96 can be a calibrated aperture in which a head 104 of the key blank K, when correctly matched to the clamp 12, matches the calibrated aperture 96 thereby confirming that the key blank is a correct match. For this purpose, in the illustrated embodiment, the first plate 90 also includes or defines a notched portion 106 of the key insertion aperture 96. The notched portion 106 can be at least partially defined by the bridge 102. In operation, a correctly matching key blank K will have a head 104, and more particularly a leading edge portion 104a of the head, that substantially matches the notched portion 106. The bridge 102 is effective in providing calibration to the aperture 96 so as to enable only a matching key blank K to be inserted into the aperture 96, based primarily on the thickness of the key blank K.

The bridge 102 also functions to prevent the key from tipping when the key is clamped between the jaws 40,42 and/or undergoing machining. Thus, the end plate 90 and the aperture 96 can be said to prevent the key blank K from tipping when the key blank is installed between the jaws 40,42. Specifically, the bridge 102 acts as an obstruction to the head 104 and/or a portion of the blade 100 adjacent the head. As an obstruction, the bridge 102 engages and thereby prevents these elements of the key blank K from lifting from the clamp 12, and particularly the jaw surface 52a of the clamp. Additionally, as best illustrated in FIG. 1, the bridge 102 has its outer or uppermost edge 108 chamfered (defining chamfered portions 108a, 108b and 108c) for purposes of better enabling the bridge 100 to properly interface with an edge of a protective guard (not shown) provided on the key cutting machine for protecting operators from its cutting tool.

The plate 90 additionally includes a lower edge or sloping portion 110 that partially defines a bottom of the aperture 96. Specifically, the sloping lower edge 110 slopes or tapers downwardly toward an outside of the clamp, defined by outside surface 112 of the plate 90, so as to enable milling chips creating during cutting of the key blank K to fall down and off, i.e., to be smoothly ejected or effectively conveyed off, for purposes of keeping a key cutting area, defined as the area wherein the milling cutter is cutting the key blank K, constantly clean and free of milling chips. Correspondingly, a sloping surface 114 of the protruding surface portion 52 has a similar inclination, which substantially joins up in a mating relation with the sloping edge 110 to provide a substantially continuous sloping path for chips to fall away from the cutting area.

The clamp 12 further includes a means for engaging a tip or distal end of specified key blanks that are to be coded or cut by the key cutting machine. More specifically, in the illustrated embodiment, the means for engaging a tip or distal end of specified key blanks includes an upper edge 116 of the other or second plate 92 that protrudes or rises above the plane of the jaw surface 52a thereby forming a tip-stop portion or abutment 118. The tip-stop abutment 118 is particularly for key blanks having a relatively greater length, such as the key blank K which has its leading head edge 104a engaged or closely adjacent the notched portion 106 while a distal end 120 thereof engages the tip-stop abutment 118. The key blank distal end 120 is also referred to herein as a tip and/or a tip portion.

For different length key blanks, particularly key blanks having a relatively shorter length, the means for engaging a tip or distal end of specified key blanks further includes, in the illustrated embodiment, a movable tip-abutment member 122. More specifically, the tip-abutment member 122 is capable of sliding along guiding ribs (not shown) provided as runners on inner surface 124 of the plate 92 and, respectively, a corresponding surface 126 of the jaw 40 extending parallel relative to surface 124. The corresponding jaw surface 126 defines a recess in the jaw 40, along with jaw surface 128, which together with surfaces 124,126 forms a groove 130 within which the tip abutment member 122 is able to slide, as indicated by the bidirectional arrow 132.

In the illustrated embodiment, an upper surface 134 of the tip abutment member 122 is coplanar with the jaw surfaces 48,50 so as to prevent the member 122 from being a hindrance on the cutting plane of the key blank K. Additionally, and advantageously, in a preferred embodiment, the tip abutment member 122 remains both constantly coupled to the clamp 12, due to the provision of, for example, a stop dowel or some other kind of abutment means (not shown) limiting the sliding extent thereof, and slidable along the grooves (or runners) largely known to those skilled in the art and, therefore, not shown in the Figures.

In operation, the tip abutment member 122 is movable as indicated by arrow 132 between a protruding position and a retracted position. In the retracted position (illustrated in FIG. 1), the tip abutment member 122 permits the distal end 120 of the key blank K to extend to and possibly contact the tip-stop abutment 118 of the end plate 92. In the protruding position, the tip abutment member 122 extends toward the moveable jaw 42 and provides a stop for distal ends of key blanks having appropriate or relatively shorter lengths. Thus, the clamp 12 is adapted to accommodate plurality of key blanks having different lengths.

The second plate 92 includes or defines an aperture 140 therethrough. The plate 92 additionally includes a lower edge or sloping portion 142 that defines a bottom of the aperture 140. Specifically, the sloping lower edge 142 slopes or tapers downwardly toward an outside of the clamp, defined by outside surface 144 of the plate 92, so as to enable the milling chips created during cutting of the key blank K to fall down and off, i.e., to be smoothly ejected or effectively conveyed off, for purposes of keeping the key cutting area constantly clean and free of milling chips. Correspondingly, a sloping surface 146 of the protruding surface portion 52 has a similar inclination, which substantially joins up in a mating relation with the sloping edge 142 to provide a substantially continuous sloping path for chips to fall away from the cutting area.

The clamp 12 further includes an identification member or means, which, in the illustrated embodiment, is provided in the form of a fixed check member 150 formed on the upper surface 116 of the plate 92. More particularly, the fixed check member 150 of the illustrated embodiment is generally rectangular and extends upwardly from the upper surface 116. The fixed check member 150 can be used by the cutting machine for determining if the clamp 12 is correct relative to a key selected on the cutting machine for generation or duplication and/or for precisely adjusting a cutting path of the machine relative to the location of the clamp 12 thereon.

In one embodiment, the cutting machine includes a tracer that makes electromechanical contact with the fixed check member 150 on two sides thereof. On a first side, the tracer determines if the clamp 12 is correct for a selected key to be made or generated. The fixed check member 150 can have specific dimensions relative to other clamps that enable the cutting machine to determine if the clamp 12 is an appropriate clamp for the selected key. On a second side, the tracer performs a setting and adjustment operation that enables reference dimensions on a working plane of the clamp 12 to be established for the cutting tools (i.e. a milling cutter of the cutting machine and the tracer itself) and to be corrected, when necessary or desirable.

The clamp 12 of the illustrated embodiment also includes a reference or second check member 152 disposed on the movable jaw 42. More particularly, the second check member 152 of the illustrated embodiment is generally rectangular and extends upward from the moveable jaw top surface 50. The second check member 152 can be used in applications where an axis of the key blade 100 is desirably considered as a reference for key cutting. In one embodiment, the check member 152 is detected or referenced by the tracer of the cutting machine after the key blank K is installed and clamped in the clamp 12 to determine the width of the key blade 100. The cutting machine can include a means for accommodating different key blank widths that operates in conjunction with the second check member 152 and/or can be configured to make an additional reference dimension correction when certain widths are detected by engagement between the tracer and the second check member 152.

As illustrated, the clamp 12 can additionally include marking indicia 154 thereon, such as on the end plate 90 in the illustrated embodiment, for readily distinguishing the clamp from other similar looking clamps that are adapted for use with other types of key blanks. Such other clamps could be provided with fixed check members having different dimensions so that the key cutting machine is able to distinguish between the clamps upon electromechanical contact with their respective check members by a tracer or the like of the key cutting machine. The marking indicia allow an operator to readily distinguish the clamps prior to mounting on the key cutting machine.

In operation, the key blank K is inserted through the calibrated aperture 96 and the blade 100 is rested upon the surface 52a wherein the key blank K is in its cutting position. In the illustrated embodiment, insertion of the key blank K occurs until the distal end 120 contacts or is closely adjacent the tip-stop abutment 118 and the head leading edge portion 104a contacts or is closely adjacent the notched portion 106. Since the portion 104a matches or fits into the notched portion 106, the user is informed or the key blank K is identified as a correct match for the clamp 12. In the event that the key blank head does not match the notched portion 106, the user is informed or the key blank is identified as an incorrect match for the clamp 12. If the key blank is a match, but a distal portion does not contact or rest closely adjacent the abutment 118, the moveable key-tip abutment member 122 is moved toward its protruding position.

With the key blank K properly inserted and identified as a match for the clamp, the handle 74 is turned to clamp the blade 100 between the jaws 40,42. More specifically, turning of the handle 74 causes the threadedly engaged pin 70 to forcibly move the moveable jaw 42 against the urging of the springs 60,62 toward the fixed jaw 40, clamping the key blank blade 100 therebetween. The bridge 102 extends over the blade 100 to prevent the key blank K from tipping during cutting thereof by a suitable key cutting machine. Either prior to or after installation of the key blank K in the clamp 12, the clamp is installed in the key cutting machine, as is known and understood by those skilled in the art.

The clamp 12 can be used in conjunction with any type of suitable key cutting machine; however, it is particularly suitable for use in conjunction with the key cutting machine of the kind described in the above-referenced U.S. patent application entitled "KEY CUTTING MACHINE." Advantageously, this key cutting machine uses a low number of clamps, such as clamp 12, and, in a preferred configuration, uses only four clamps, each similar to clamp 12 but adapted for use with various sizes of key blanks. Moreover, this key cutting machine is particularly suited for use in creating and/or duplicating "laser-type" keys of the type currently being used in the automotive industry, wherein a quick and simple identification of the correct clamp and matching key blank is of paramount importance.

The clamp 12 of the illustrated embodiment provides and/or includes several advantageous features, including the ability to reliably enable and ensure a correct pairing between key blank model and clamp or vice; the ability to reliably ensure that the key blank is firmly positioned in the clamp without any risk, or at least with reduced risk, of the key blank tilting or tipping over; the ability to ensure an improved cleaning of the plane on which the key blank is due to rest during cutting; the provision of a key-tip abutment arrangement that is constantly associated and/or connected to the clamp, however without interfering with working tools of the cutting machine; and the automatic detection of the position the clamp on the two axes of the working plane, while keeping the setting along the longitudinal axis of the cutting tool fixed.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A clamp for a key cutting machine, comprising:
a base portion having opposing shoulders defining an accommodation;
a pair of jaws housed in said accommodation of said base portion that hold a key blank during cutting thereof, at least one of said jaws is movable relative to the other one;
an adjustable locator device disposed on at least one of said base portion and said pair of jaws that adjustably moves the key blank into a cutting position relative to said base portion; and
opposed plates closing open ends of said accommodation, one of said plates includes a key insertion aperture for insertion of the key blank between said pair of jaws to identify said key blank as a correct match and prevent said key blank from tipping over.

2. The clamp according to claim 1, wherein said key insertion aperture is defined by a bridge member of said one of said plates, said bridge member closes said key insertion aperture on a top side thereof.

3. The clamp according to claim 2, wherein the bridge member engages said key blank and thereby identifies said key blank as a correct match and prevents said key blank from tipping over.

4. The clamp according to claim 1 wherein one of said jaws includes a protruding surface portion that is receivable in a shaped recess of the other of said jaws enabling said jaws to precisely interpenetrate one another, said protruding surface portion also forming a resting surface for the key blank.

5. The clamp according to claim 1 further including a key-tip abutting means for specified key blanks to be coded or cut, said key-tip abutting means formed by at least one of an edge of one of said plates and a tip abutment member slidable in a groove formed between said edge and a jaw edge of an adjacent one of said jaws.

6. The clamp according to claim 1, wherein said plates define apertures, including said key insertion aperture, having respective sloping edges for cutting chips to fall off and clear a cutting area.

7. The clamp according to claim 1 wherein one of said jaws includes a press-fitted dowel (S) forming a fixed calibration and selling reference contact for a machine tool along an axis extending orthogonal to a cutting plane of the key blank.

8. The clamp according to claim 1 further including a fixed check member forming an identification member, said fixed check member attached to an edge of one of said plates.

9. The clamp according to claim 8 further including a second check member on said movable jaw that enables a width of a blade of the key blank to be determined.

10. The clamp according to claim 1, wherein said base portion includes a protruding rest-on abutment which acts as a limit stop when sliding said base portion into position in a cutting machine.

11. The clamp according to claim 1, wherein said jaws engage blade side edges when holding the key blank for cutting thereof.

12. A clamp for a key cutting machine, comprising:
a base portion supporting a pair of opposed jaws, at least one of which is moveable relative to the other for holding a key blank for cutting by the key cutting machine; and
an end plate adjacent said jaws and defining a key insertion aperture that matches heads of matching key blanks for confirming that an inserted key blank is a correct match for the clamp, said end plate and said key insertion aperture prevent the key blank from tipping when the key blank is installed between said jaws.

13. The clamp of claim 12 wherein said base portion defines a channel wherein said pair of jaws are received.

14. The clamp of claim 12 further including a second end plate opposed to said end plate, said end plates closing open ends of a channel defined by said base portion for receiving said pair of jaws.

15. The clamp of claim 12 wherein said end plate includes a bridge portion that closes an upper side of said key insertion aperture and engages the key blank to prevent the key blank from tipping.

16. The clamp of claim 12 wherein one of said jaws includes a protruding surface portion upon which the key blank rests during cutting thereof, said protruding surface portion receivable in a recess of the other of said jaws.

17. The clamp of claim 12 further including a tip abutment member slidable in a groove formed between an edge of a second end plate positioned along said base portion opposite said end plate and an adjacent one of said jaws for engaging a tip portion of the key blank when installed between said jaws.

18. The clamp of claim 17 wherein the tip portion engages said tip abutment member when said tip abutment member is in a protruding position and engages said end plate when said tip abutment member is in a retracted position.

19. The clamp of claim 12 wherein said end plate has a sloping edge defining a lower portion of said key insertion aperture that allows cutting chips to be removed from a cutting area of the key blank.

20. The clamp according to claim 12 wherein one of said jaws includes a dowel (S) forming a fixed calibration and setting reference contact for a machine tool along an axis extending orthogonal to a cutting plane of the key blank.

21. The clamp according to claim 12 wherein said base portion includes a dove-tail shaped rib extending from an underside of said base portion that is cooperatively received in a corresponding groove of the key cutting machine.

22. The clamp of claim 12, wherein said opposed jaws engage blade side edges of the key blank to hold the key blank.

23. A clamp for a key cutting machine, comprising:
a base portion supporting a pair of opposed jaws, at least one of which is moveable relative to the other for holding a key blank for cutting by the key cutting machine;
an end plate adjacent said jaws and defining a key insertion aperture that matches a head of the key blank for confirming that the key blank is a correct match, said end plate and said key insertion aperture prevent the key blank from tipping when the key blank is installed between said jaws; and
a pin threadedly received through said base portion and engaging said moveable jaw for movement thereof upon rotation of said pin.

24. A clamp for a key cutting machine, comprising:

first and second jaws having generally planar clamping surfaces for clamping a key blank therebetween, said second jaw moveable relative to said first jaw; and a plate provided adjacent at least one of said first and second jaws, said plate having a key insertion aperture therethrough that prevents the key blank from tipping during cutting thereof, said key insertion aperture directs a blade of the key blank between said first and second jaws such that side edges of the key blank are parallel with said clamping surfaces for being clamped therebetween.

25. The clamp of claim 24 wherein said plate includes a notched portion partially defining said key insertion aperture, said notched portion matching a head of the key blank when the key blank is a correct match.

* * * * *

UNITED STATES PATENT AND TRADEMARK OFFICE
CERTIFICATE OF CORRECTION

PATENT NO. : 7,163,364 B2
APPLICATION NO. : 11/024219
DATED : January 16, 2007
INVENTOR(S) : Eros Foscan et al.

It is certified that error appears in the above-identified patent and that said Letters Patent is hereby corrected as shown below:

Claim 7, Col. 9, line 51 "selling" should be --setting--.

Signed and Sealed this

Tenth Day of April, 2007

JON W. DUDAS
*Director of the United States Patent and Trademark Office*